United States Patent
Wadell et al.

(10) Patent No.: US 8,144,406 B2
(45) Date of Patent: Mar. 27, 2012

(54) THERMAL MANAGEMENT FOR A SOLID IMMERSION LENS OBJECTIVE IN OPTICAL PROBING

(75) Inventors: Robert P. Wadell, Sacramento, CA (US); Callen Scott Kilmer, Roseville, CA (US); James Dennis Parker, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 12/646,358

(22) Filed: Dec. 23, 2009

(65) Prior Publication Data
US 2011/0149394 A1  Jun. 23, 2011

(51) Int. Cl.
*G02B 7/02* (2006.01)
(52) U.S. Cl. .......................................... 359/820; 359/819
(58) Field of Classification Search .......... 359/811–820; 324/760; 385/70–81
See application file for complete search history.

(56) References Cited

U.S. PATENT DOCUMENTS

| 7,639,030 B2 * | 12/2009 | Wadell ..................... 324/750.09 |
| 7,660,054 B2 * | 2/2010 | Wagner et al. ................. 359/820 |
| 2009/0002855 A1 | 1/2009 | Wagner et al. |
| 2009/0225442 A1 | 9/2009 | Mimouni |

* cited by examiner

*Primary Examiner* — Ricky Mack
*Assistant Examiner* — Tuyen Tra
(74) *Attorney, Agent, or Firm* — Blakely, Sokoloff, Taylor & Zafman LLP

(57) ABSTRACT

Thermal management for a solid immersion lens is described. In one example, a system includes a solid immersion lens objective, a solid immersion lens tip assembly optically coupled to the objective, and a heat exchanger thermally coupled to the objective. The system may also or alternatively include a dry purge system coupled between the lens tip assembly and the objective to remove moisture between the lens tip assembly and the objective.

17 Claims, 9 Drawing Sheets

THERMAL MANAGEMENT FOR A SOLID IMMERSION LENS OBJECTIVE IN OPTICAL PROBING

FIELD

The present description relates to the field of optically probing microelectronic and micro-mechanical devices and, in particular, to the thermal management of an optical probe.

BACKGROUND

As a part of the development and design of an integrated circuit (IC) chip, prototype chips are made in small volumes and tested. In one type of test, inputs are supplied to the chip and the outputs are then compared to what the chip is supposed to provide. This allows specific parts of the chip to be checked, tested and debugged before volume production begins. When problem areas are found, these parts of the chip are exposed to more rigorous testing. One type of rigorous testing is to aim an optical probe at a problem area and observe the problem area while the chip is being operated. Optical probes can also be helpful when the production process changes or to improve quality or yield during production.

It is important during such observations to operate the chip at all of the temperatures for which it is designed. A chip that might run properly by design at room temperature might fail when it is particularly cold or hot. This type of testing may be particularly important for chips in mobile devices that often lack fans, heaters, and stable room temperatures. Such devices often have extended temperature requirements. Some products may require reliable operation at temperatures ranging from −40 to +110 C. The optical probe must therefore be able to operate through this temperature range.

In addition, optical silicon debug is trending towards more sightings at cold temperatures including, less than 10 C and even sub-zero junction temperatures. There is a need for probing low power devices. Some such devices have such low power that they that cannot self-heat. Hot junction temperatures above the current 60 C optical probe operating temperature range are also being tested.

Current optical probes use a liquid immersion lens (LIL) in conjunction with a diamond window to get beyond a 10 C-60 C temperature range. The LIL limits productivity and capability because it does not have enough resolution to image small features on the chip. As technology moves from 32 nm to 22 nm process technology and beyond, a LIL becomes unable to resolve many of the important features and solid immersion lenses (SIL) are being considered.

BRIEF DESCRIPTION OF THE DRAWINGS

Embodiments of the present invention are illustrated by way of example, and not limitation, in the figures of the accompanying drawings in which like reference numbers are used to refer to like features, and in which.

DETAILED DESCRIPTION

The resolution of a SIL (Solid Immersion Lens) allows many post silicon debug and validation activities to occur for both 32 nm and 22 nm processes. Current SIL designs are typically intended for use at room temperature because the materials within the SIL expand and contract with temperature at different rates. The expansion and contraction can damage the SIL. In addition, at cooler temperatures (e.g. less than 10 C) and moist environments, condensation forms on the back of the lens tip that prevents imaging and waveform acquisition.

Because the SIL is designed to operate in a limited temperature range and safe thermal environment, a thermal management method and a dry purge scheme can be used to protect the SIL from extremely cold (−130 C) and extremely hot (+230 C) thermal environments. This helps prevent image degradation for the optical sensors that rely on the SIL. It also helps to avoid physical damage to the SIL. Effective thermal management can allow waveform acquisition at extreme hot and cold junction temperatures for a range of different optical probers. Some such optical probe technologies include laser voltage probes, time resolved emission, laser assisted device alteration, and infrared emission microscopy.

A SIL is not inherently able to operate at extreme hot and cold temperatures. The SIL can be damaged due to coefficient of thermal expansion mismatches in the dissimilar materials of the SIL. Running temperature controlled fluid through a SIL heat exchanger and a lens mounting block provides thermal control and isolation from extreme thermal environments that can occur while the SIL is being used in a probe or debug operation. Running a dry nitrogen gas purge into the SIL objective prevents condensation on the inner surface of the SIL tip and prevents image degradation.

According to some embodiments of the present invention, the lens temperature of a SIL is controlled by convective cooling-based thermal management hardware that is wrapped around the outer diameter of the SIL or its base or both. A flow and pressure controlled compressed dry air (CDA) or nitrogen (N2) gas is run to purge the SIL's internal assembly to prevent condensation or icing on the back of the SIL tip. This thermal management solution keeps the SIL objective temperature within a safe operating range, allowing it to function without condensation forming on the SIL tip.

Embodiments of the present invention may be applied for any extreme temperature conductive or fluidic (liquid, air, or other gas) convective thermal environment, e.g. jet impingement cooling, spray cooling, laminar/turbulent flow, conductive cooling (diamond windows or copper based heat sinks), or any other cooling technologies. In the examples described below, a type of air based jet impingement termed "convective cooling", abbreviated "C2" may be used as the thermal environment.

Figure 1:
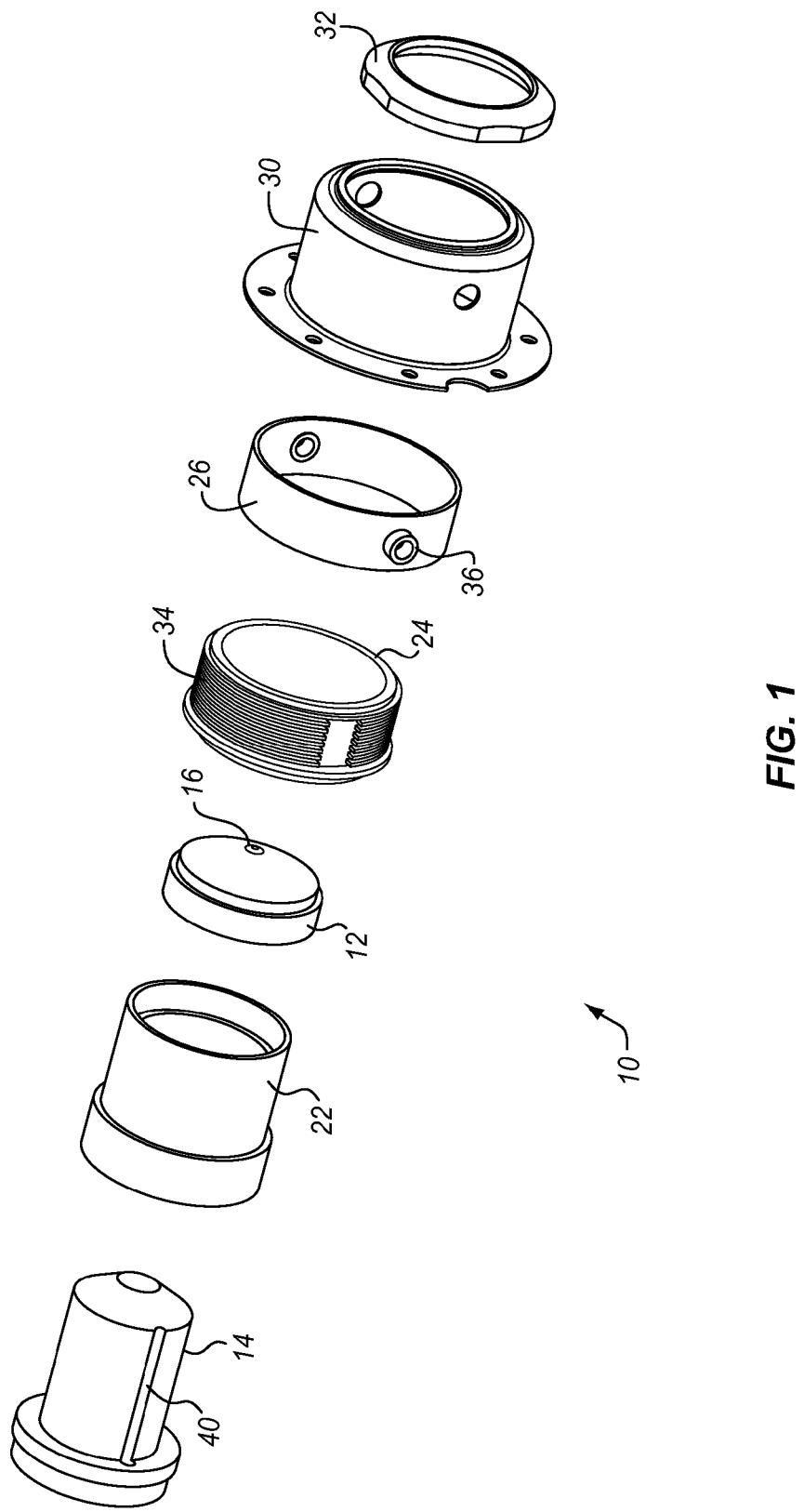
FIG. 1 is an exploded diagram of lens with thermal management features according to an embodiment of the present invention.

Referring to FIG. 1, a SIL assembly 10 is shown in an exploded view. The SIL has a tip assembly 12 and an objective 14. The tip serves as a protective cover and typically has a high transmission lens 16 of a suitable material to form a window its center through which an image of the device being probed passes. The objective images the device being probed onto an appropriate optical probe (not shown) that connects to the left end of the assembly as shown in the drawing. Accordingly, in use the device being probed (not shown) will be at the right in the figure and its circuitry or structures will be imaged onto an optical probe (not shown) at the left in the figure.

The SIL objective is mounted in an outer cover 22 that has a variety of protective and mounting fixtures depending on the particular embodiment. A heat exchanger 24 attaches to the outer cover and is enclosed by a fluid coupler 26. The fluid coupler conducts fluid from an outer supply and returns the fluid through the heat exchanger. Over the end of the tip, an elastomeric, insulating cover 30 is attached and held in place around the tip assembly by a threaded ring 32. This gasket prevents fluids used in the optical probing process from entering the casing and affecting the SIL objective and tip assembly. The diagram of FIG. 1 is simplified for ease of understanding. A variety of connectors, threads, gaskets, springs and other attachment devices may be used to hold the parts together that are not shown in the simplified diagram.

Figure 2:
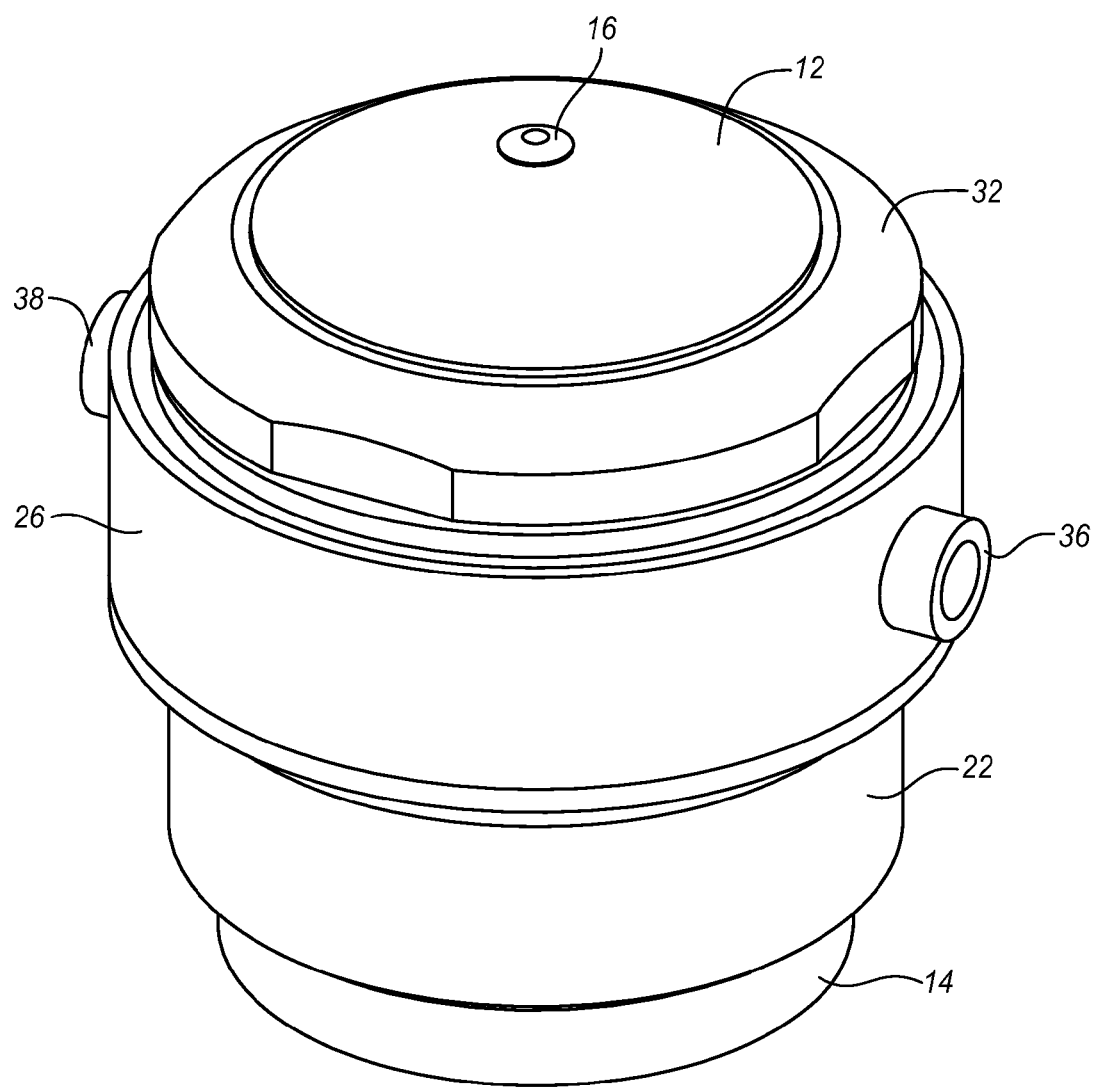
FIG. 2 is a perspective view of the lens assembled according to an embodiment of the present invention.

FIG. 2 shows the components of FIG. 1 fully assembled. The SIL tip assembly 12 extends through the end of the fluid coupler 26 and is held in place by the threaded ring 32. The objective 12 is mostly protected by its casing 22 and the elastomeric cover 30. Other components (not shown) are concealed inside the outer covers.

Figure 3A:
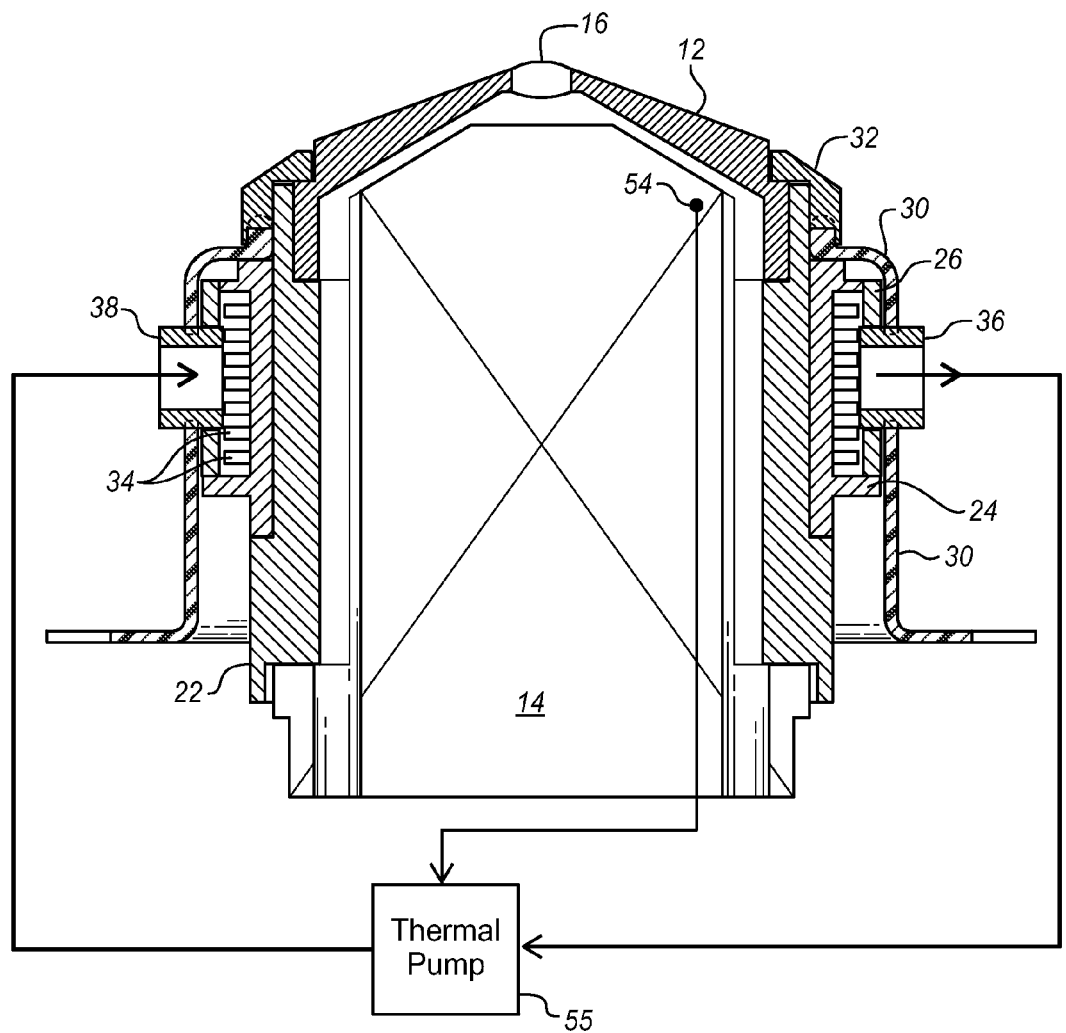
FIG. 3A is a cross-sectional diagram of a lens with a thermal management heat exchanger according to an embodiment of the present invention.

FIG. 3A is a cross-sectional view of the assembly of FIG. 2 to show the structures that are concealed in FIG. 2. In this example, a fluid heat exchanger is used without a dry purge system. As before, the SIL tip assembly 12 and its window 16 are at one end of the assembled device and the SIL objective 14 extends through the other end. FIG. 3A shows that the fluid coupler 26 surrounds rings on the outside edge of the heat exchanger to create a series of channels 34 around the outer cover 22 of the SIL objective 14. As shown in FIG. 1, the channels extend around the circumference of the heat exchanger 24.

The fluid coupler has two ports, 36, 38. A cooling fluid can be introduced into one port, in the illustrated example the left port 36, and evacuated out the other port, in the illustrated example the right port 38. More or fewer ports can be used depending on the application. The two ports couple the fluid into the heat exchanger channels 34 to affect the temperature of the SIL objective 14. The heat exchanger channels are thermally coupled to the SIL objective. In the illustrated example, the heat transfer is by conduction through the outer casing that acts as a heat spreader. However, a variety of other approaches can be used to thermally couple the fluid to the SIL objective.

A thermal pump 55 is coupled to the ports to supply the fluid at the desired temperature. A temperature sensor 54, for example a thermal diode, is thermally coupled to the objective. It is coupled to the thermal pump or to some other control mechanism. The temperature sensor measures the temperature of the objective. The thermal pump can use this information to adjust the temperature of the fluid, adjust the flow rate of the fluid and adjust other parameters of the cooling system. This allows the thermal pump to keep the objective within its best operating temperature range as much as is possible.

Figure 3B:
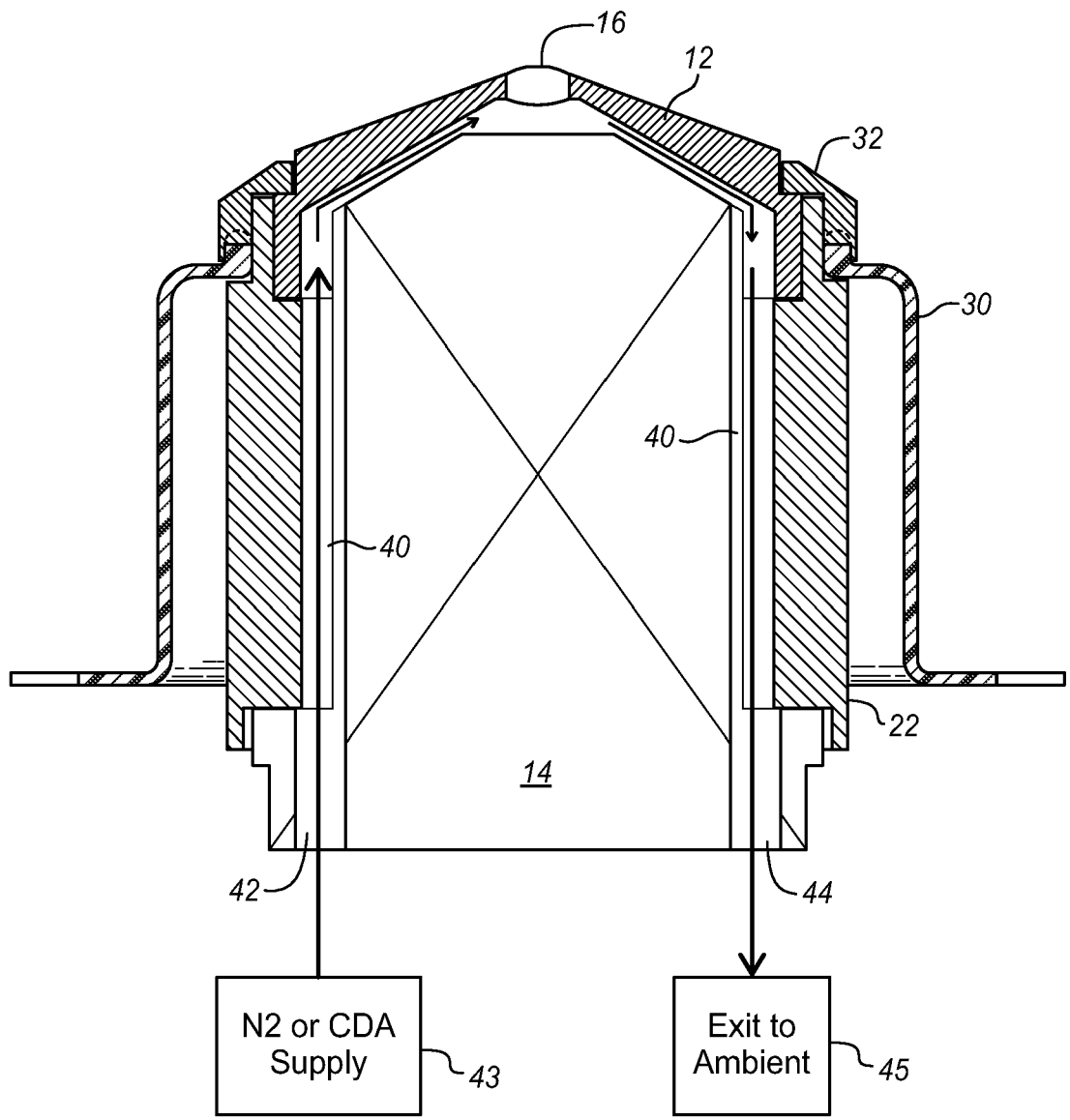
FIG. 3B is a cross-sectional diagram of a lens with a dry gas purge system according to an embodiment of the present invention.

FIG. 3B is a cross-sectional view of the assembly of FIG. 2 to show the structures that support a dry purge system without a heat exchanger. The same reference numbers as in FIG. 3A refer to the same structures. A passageway 40 on either side of the SIL objective 14 extends the entire length of the objective to the underside or inside of the tip assembly 12. The passageway 40 connects to an air gap between the SIL objective and the tip assembly. Opposite the tip assembly, there is an opening for each passageway. The openings allow a fluid to be introduced on one side, in the illustrated example the left side 42, and evacuated on the other side, in the illustrated example the right side 44. Since the passageways are open to the gap between the objective and the tip assembly, the passageways allow this gap to be heated, cooled, rinsed, or purged, inter alia.

The left and right openings are coupled to a dry gas pump 43, such as an N2 purge pump or a compressed dry air pump that pumps a dry purge gas into the left side opening. The pump may draw the dry purge gas out of the right side opening or the gas may be released to ambient through an exit. To recirculate the gas, the pump must also be equipped with a processing handling system to dry the air and clean it of any materials that may have been introduced by the SIL. Alternatively, instead of a pump a reservoir or tank of compressed gas or other fluid may be used. While N2 and CDA are presently used, any fluid that is inert to the SIL materials and capable of flushing condensation away from the interior of the SIL may be used. A different fluid may also be chosen for thermal, cleaning or other properties.

Figure 3C:
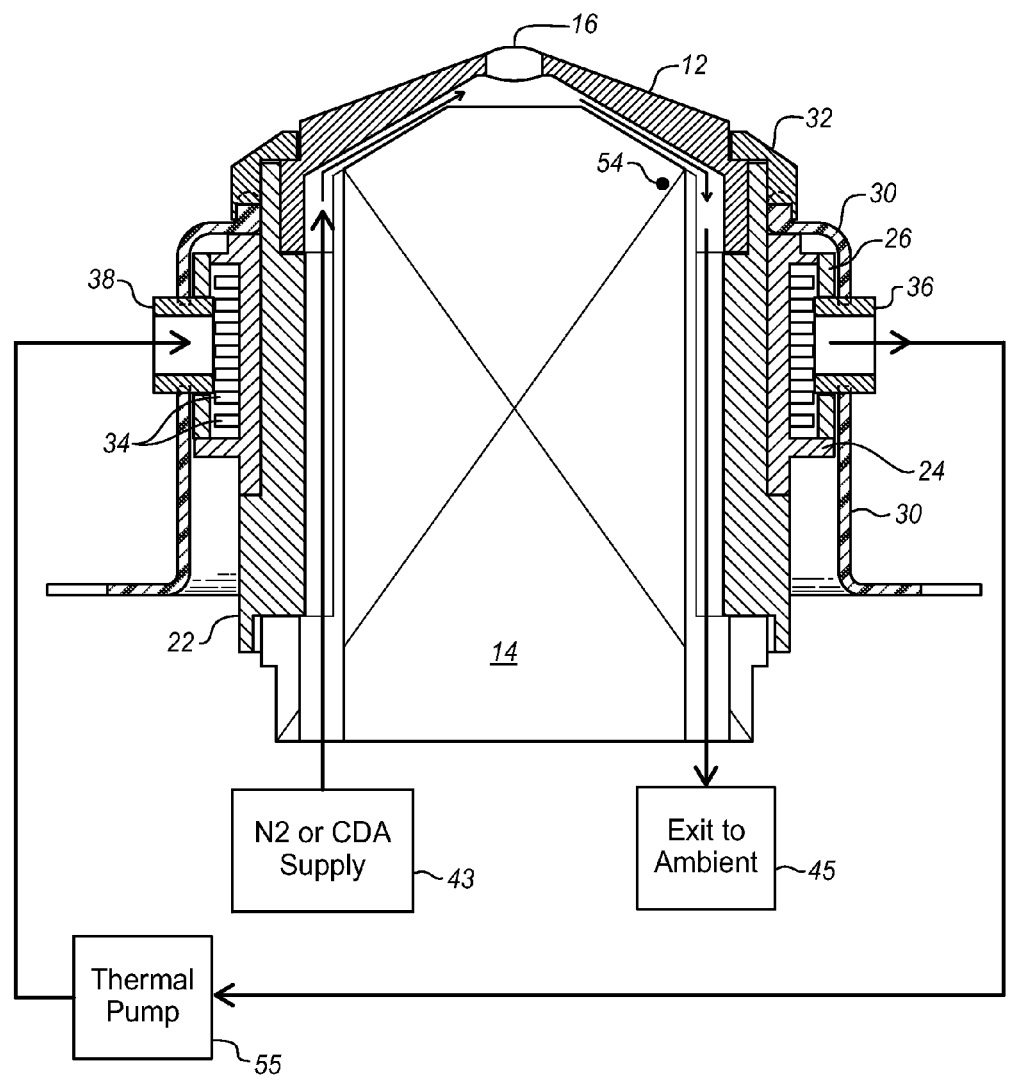
FIG. 3C is a cross-sectional diagram of a lens with a thermal management heat exchanger and a dry purge gas system according to an embodiment of the present invention.
Figure 5:
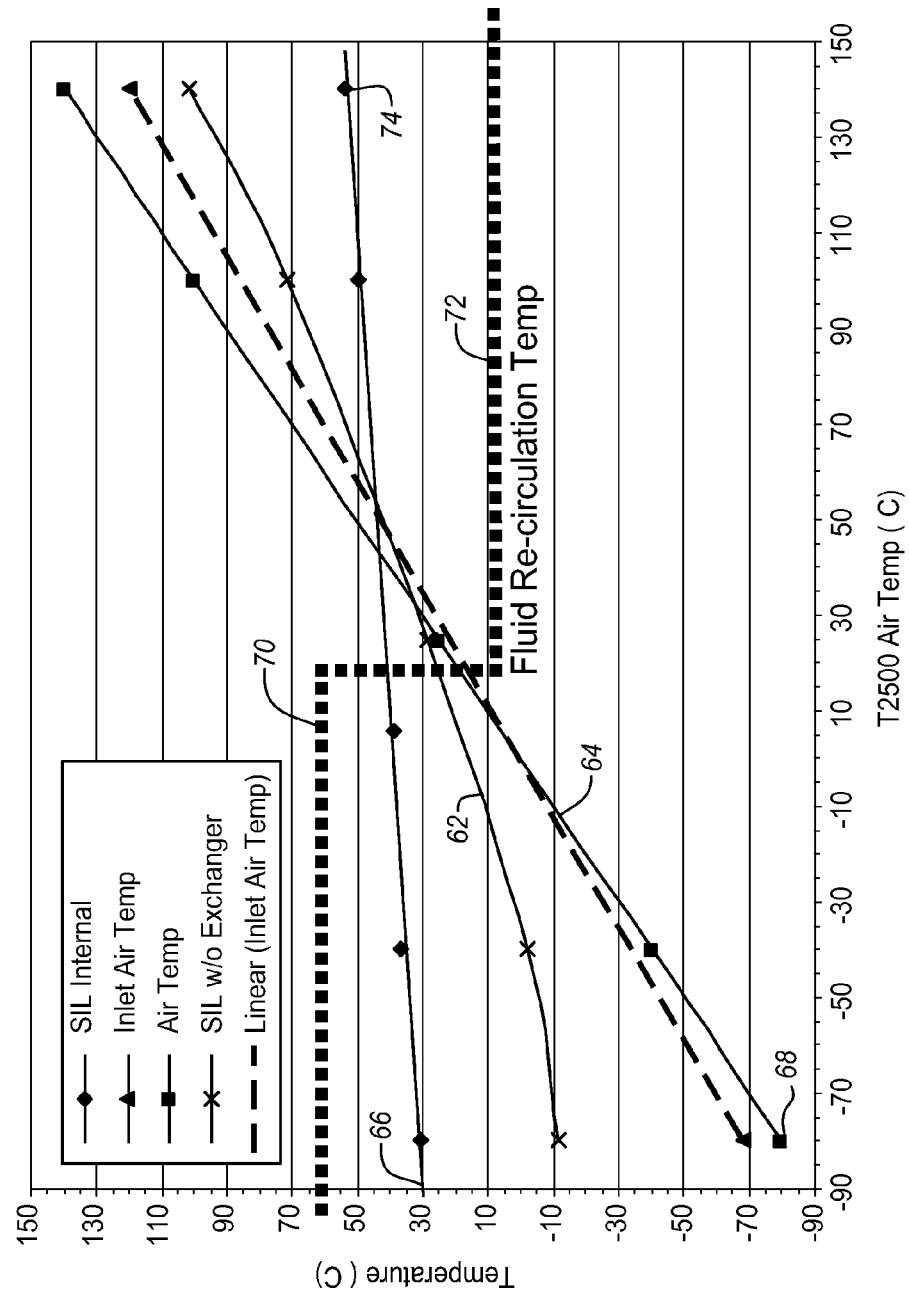
FIG. 5 is a graph of thermal conditions of the debug tool of FIG. 4.

FIG. 3C is a cross-sectional diagram of the assembly of FIG. 2 with both a thermal heat exchanger and dry air purge system fitted. The same reference numbers are used for the same components as in FIGS. 3A and 3B. A SIL may be fitted with one or the other system as shown in FIGS. 3A and 3B or with both as shown in FIG. 3C, depending on the application. Additional thermal and environmental management systems may also be added to any of the three illustrated alternatives. Since the two systems provide different benefits, each improves the system independently of the other. However, when both systems are combined, greater benefits are attained. The heat exchanger extends the operational environmental temperature range of the SIL as shown in FIG. 5. The dry purge system improves the resolution of the SIL system across a greater range of temperatures. Together, the SIL can be used across an even greater range of temperatures.

Figure 4A:
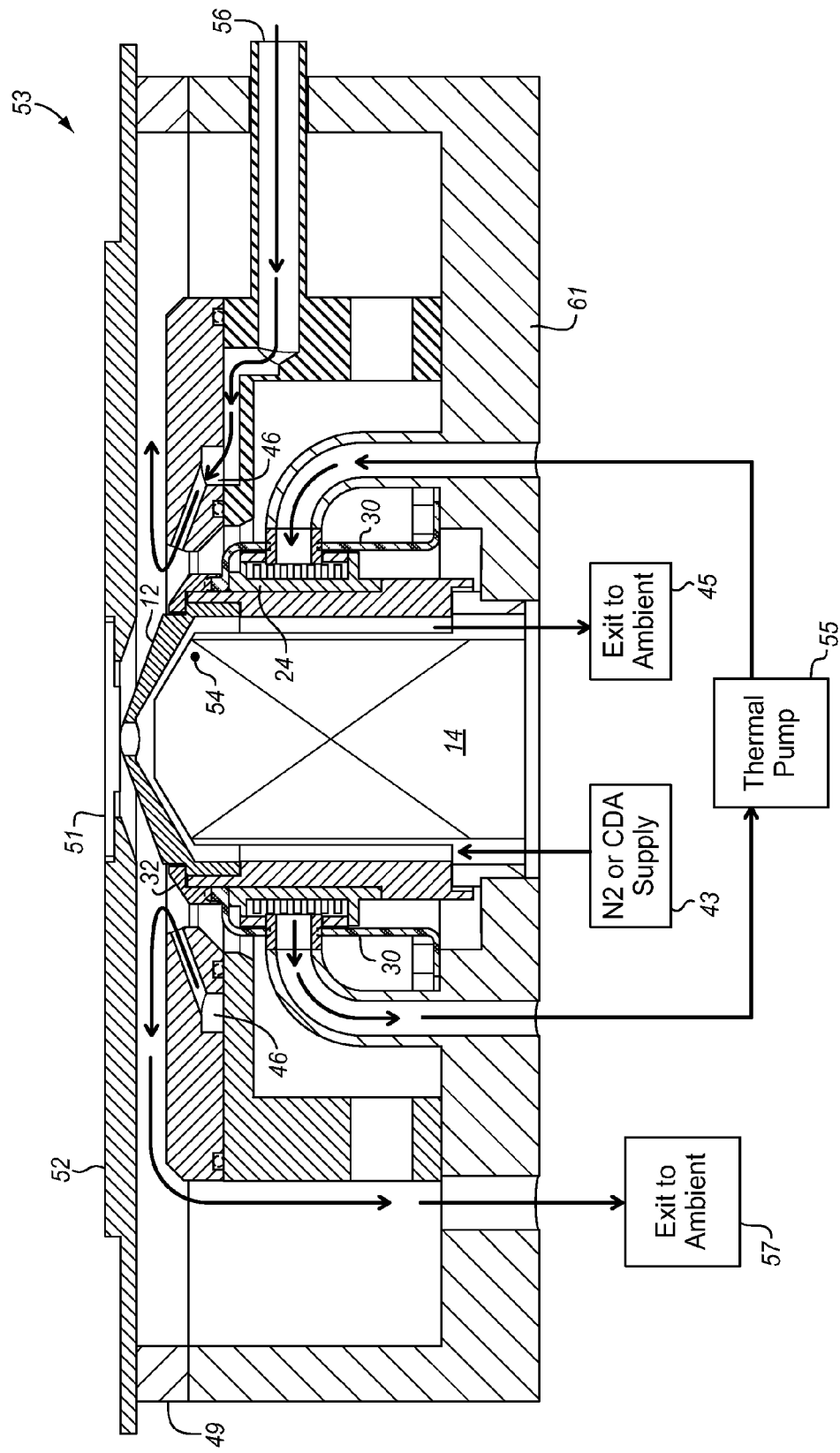
FIG. 4A is a cross-sectional diagram of an optical debug tool with a lens according to an embodiment of the present invention.

FIG. 4A shows an example of a SIL in an operating environment with associated equipment. In the illustrated example, the associated equipment is a SIL debug tool 53. In FIG. 4A, a packaged die 51 is mounted to a holder 52 to be tested. The die is the device under test (DUT). This places the die directly in front of the SIL tip assembly so that the die can be tested, debugged, mapped, or so that some other optical tests can be applied. The SIL debug tool is provided only as an example, embodiments of the present invention can be adapted to different types and configurations of test equipment and can be used to test different type of microelectronic and micromechanical systems.

FIG. 4A also shows a convective thermal control nozzle 46. The convective cooling nozzle directs heated or cooled air directly to the die and the space around the die and can be used to heat or cool the die in order to simulate different operating conditions. An air pump 56 delivers air flow at, for example, 300-600 CFH (cubic feet per hour) and at a temperature ranging from, for example, about −130 C to about +230 C to cool or heat the die and the SIL tip assembly. There are several alternatives to the convective cooling using an air pump such as jet impingement cooling, spray cooling, laminar/turbulent flow cooling, etc. In addition, other liquids and gases can be used. The air exits the debug tool 53 through an exit port 57 to the ambient. The air is confined by a seal 49 that seals the die in a chamber with the SIL.

For testing a circuit under its conditions of normal use, the air pump alone can typically maintain the portion of the die that is being probed within a temperature range of −40 C to +110 C. This is a normal range of test operating temperatures at a junction on the microprocessor or other IC (Integrated Circuit) that is being probed or debugged.

For cold temperature probing, for example at temperatures colder than the dew point of the air in the SIL objective, typically around 10 C, the image formed by the SIL objective degrades. This is caused in part by condensation on the back of the SIL tip assembly and in part by high thermal gradients across the SIL objective. In other words, the part of the objective closest to the cold die becomes much colder than the part of the objective opposite the die. As a result, an accurate image and sensor waveform cannot be acquired. Similarly, for hot temperature probing at temperatures above +110 C, the objective becomes much hotter closer to the die. Image and waveform acquisition can also become impossible. The uneven heating and cooling of the SIL objective also risks damage to the objective.

The SIL objective can be protected and thermal gradients across the lens can be reduced using the heat exchanger 24 and thermally conductive base 61 of the debug test tool. The heat exchanger and base can prevent image degradation at cold temperatures, manage the thermal gradients across the lens, prevent damage to the SIL objective, and reduce thermal stabilization time. The ports 36, 38 of the heat exchanger 24 and base are coupled to connecting pipes through which a thermally controlled fluid is pumped. A fluid pump 55 is coupled to both pipes to pump heated or cooled fluid through the base and heat exchanger. Since the SIL objective is thermally coupled to the base, and the base is directly in the fluid path to the heat exchanger, the temperature of the lower part of the SIL objective is also heated or cooled by the base.

To manage the temperature gradients across the lens when the IC being probed is hot, the SIL heat exchanger can be used with a cold fluid. To manage the temperature gradients when the IC is cold, the heat exchanger can be used with a warm fluid. The thermal pump can be operated to maintain the fluid temperature within a predetermined range. This can be done based on the temperature of the fluid returning to the pump, by sensing temperatures of the lens, IC, and other parts of the system or by a combination. In addition, the thermal pump can be operated to anticipate temperature changes. Information about a thermal test can be provided to the heat pump so that, for example, the SIL is warmed before the IC is cooled or vice versa.

As mentioned above, the heat exchanger has micro-channels 34 and is mounted around the outer diameter of the SIL objective 14 near the top of the SIL. This is the part of the objective that is most affected by the temperature of the die and convective cooling nozzle. For cold temperature debug cycles, hot re-circulated fluid up to, for example 60 C, can be circulated through the micro-channels to warm the end of the objective. This prevents heat conduction by providing a thermal barrier from the cold, for example −130 C air environment delivered by the conductive, convective cooling nozzle surrounding the SIL tip assembly. The fluid in the SIL heat exchanger absorbs the heat loss or gain from the air instead of the SIL objective absorbing that heat. The fluid in the SIL heat exchanger is then re-circulated to desorb the heat loss or gain from the air and maintain its temperature. A variety of different fluids with sufficient heat capacity can be used in the heat exchanger. Water or various other known coolants are suitable choices.

In this way, the SIL heat exchanger minimizes unwanted temperature gradients along the vertical direction of the SIL objective, as shown in FIG. 4, that could degrade image quality. In addition, the SIL heat exchanger reduces the time of image drift, which occurs when reaching thermal equilibrium due to expansion and contraction of the objective material.

In the same way, when the die is operated at high temperature and when the convective cooling nozzle is used instead to heat the die, cold fluid can be pumped through the heat exchanger. This will have a similar but opposite effect. The cold fluid will act as a thermal barrier to the hot environment around the tip. This will maintain a more consistent temperature for the objective, protecting the objective from damage and improving image quality.

In addition, FIG. 4A shows the passageways to the air gap between the SIL tip and the SIL objective. As mentioned above, in operation, this area is prone to condensation when the temperature of the SIL tip falls below the dew point of the air inside the SIL. This condensation can form as condensation or icing on any of the SIL optics used for imaging and waveform acquisition. To prevent condensation, a dry nitrogen N2 gas purge or compressed dry air or other purge gas can be used to evacuate any moisture in the air gap, dropping the dew point below the SIL tip temperature. Either a pump or a source and exhaust system can be used depending on the application.

Figure 4B:
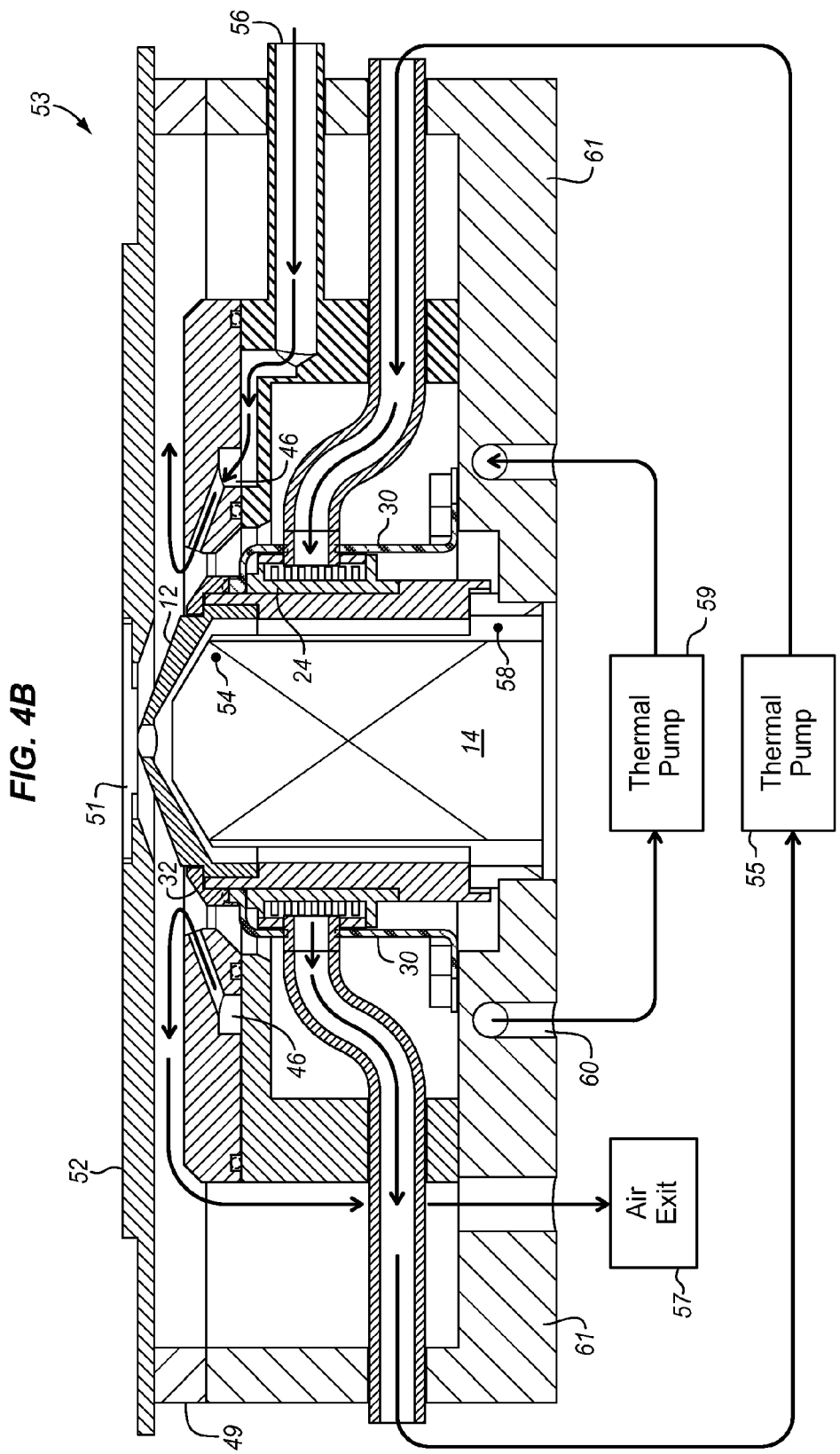
FIG. 4B is a cross-sectional diagram of an optical debug tool with a lens according to another embodiment of the present invention.

FIG. 4B shows another embodiment similar to FIG. 4A but with an additional fluid thermal pump 59. The additional thermal pump controls the flow of fluid through the base 61 of the debug test tool. The base is fitted with channels 60 into which the pump 59 circulates a fluid at a particular temperature and flow rate. The thermal pump is coupled to a second thermal sensor 58 placed near the bottom of the SIL objective. The lower thermal management system is used to heat or cool the base of the debug tool. Since the SIL objective is thermally coupled to the base, the temperature of the lower part of the SIL objective can be heated or cooled using the lower thermal management system.

When the die is operated at very hot or cold temperatures, the window 16 is heated or cooled because of it direct contact or very close proximity to the die. This heating or cooling is conducted through the tip assembly 12 and then into the SIL objective 14. The top of the SIL objective, accordingly is being heated or cooled. The bottom of the SIL objective, however, is further away from the die and the SIL tip assembly and has much less exposure to the extreme temperatures. The bottom part of the SIL objective is only heated or cooled by the top part of the SIL as the heat or cold is conducted through the SIL objective and through the housings and casings that surround the SIL objective. If the upper and lower parts of the SIL are too different in temperature, then the SIL objective can be destroyed.

In the illustrated example, the upper thermal sensor 54 provides temperature information about the top of the SIL objective and the lower thermal sensor provides temperature information about the bottom of the SIL objective. The temperature information can be sent only to the respective upper and lower thermal pumps to regulate the temperature of each respective portion of the objective. Typically, the lower part of the SIL is at a more moderate temperature and requires less compensation than the upper system. Alternatively, the temperature information can be combined to determine the temperature gradient or difference between the upper and lower parts of the SIL.

FIG. 5 provides a graphical representation of results that can be obtained under different operating conditions using the debug tool described and shown above. This chart shows temperature ranges both with and without the upper heat exchanger in use. The air temperature line 64 shows the temperature of the air around the die. This temperature can be measured in a variety of different ways, including by measuring the air retrieved from the convective cooling nozzle for recirculation. Deactivating the heat exchanger and N2 purge, and running fluid through the SIL mounting block, the temperature of the SIL is shown by the line marked "SIL w/o exchanger."

The image captured by the SIL objective degrades when the SIL objective reaches a temperature of 10 C at point 62. This corresponds to a conductive, convective air temperature of −10 C at point 64. Because the SIL tip assembly is in direct contact with the IC being probed, the SIL tip assembly will be much colder than the SIL objective. This can cause icing and condensation. The N2 purge described above can reduce this effect.

With the SIL heat exchanger and purge activated, the SIL temperature as shown by the line marked "SIL internal" was kept at 30 C at point 66 and the image had no degradation all the way down to a junction temperature of −25 C and an air temperature of −100 C (not shown). The SIL internal temperature can be measured by a thermal diode near or in direct thermal contact with the SIL.

The chart of FIG. 5 also indicates the use of two different temperatures for the fluid circulated through the heat exchanger. At an air temperature of −80 C at point 68, the SIL heat exchanger can maintain the SIL internal temperature above 30 C by using a fluid re-circulation temperature of, for example, 60 C at line 70. Without the SIL heat exchanger, the SIL internal temperature can reach −20 C. This is outside the acceptable temperature range of the SIL which is designed for use at room temperature of about 25 C. At higher temperatures, the heat exchanger fluid can be switched to 10 C. This keeps the SIL from becoming too hot and can maintain the SIL within its normal temperature operating range. In the chart of FIG. 5, this range is below 60 C at point 74 and is maintained even at junction (or DUT) and air temperatures as high as 150 C.

Figure 6:
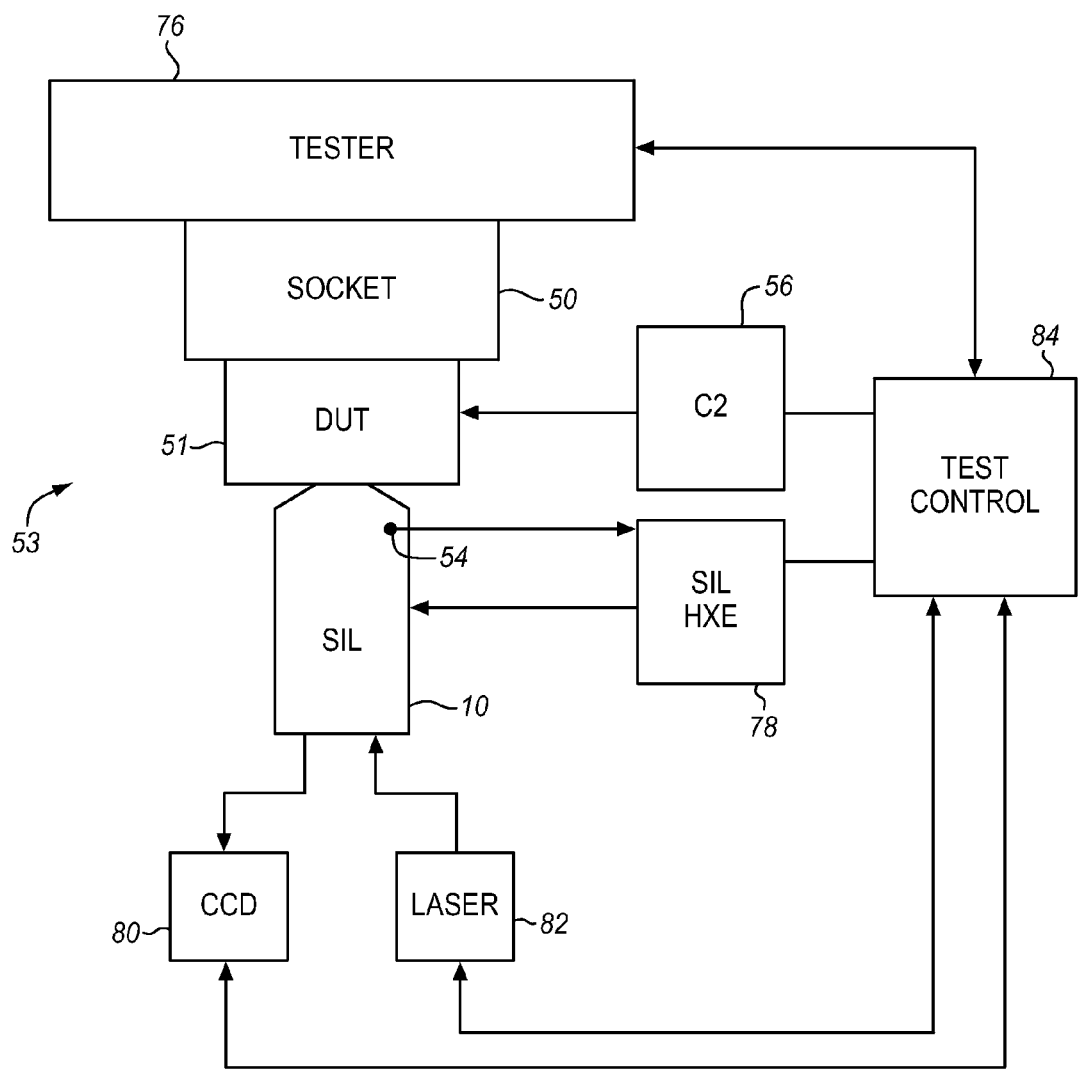
FIG. 6 is a block diagram of a microelectronic and micro-mechanical optical test system according to an embodiment of the invention.

FIG. 6 is a simplified block diagram showing one possible implementation of an entire debug and test tool incorporating embodiments of the present invention. In FIG. 6, the die to be tested 51 is mounted to a socket 50 of a tester 76. The tester operates the die simulating normal operation or operating specific test routines. It sends data and control signals into the die and then measures the response of the die. The tester can include special probes to examine internal signals or it can be coupled only to the pins that are used in normal operations.

The SIL 10 is typically positioned in physical contact to the die so that it can examine the operation of the die. A laser or other optical probe source 82 is optically coupled to the SIL objective and to an imaging array 80, such as a CCD (Charge Coupled Device) is also optically coupled to the laser. For many tests, the laser sends pulses or signal to the die and their reflection is imaged onto the CCD. However, for other tests, the die is passively imaged without use of the laser. The optical components 80, 82 are coupled to a test controller 84 that drives the tests and evaluates the results.

The test controller can also be coupled to the convective cooling system 56 described above, to control or manage the temperature of the die and to the SIL thermal management system 78. The SIL thermal management system can include the heat exchanger or the gas purge system or both as described above in the context of FIGS. 3A, 3B, and 3C. The thermal management system receives temperature information from a thermal sensor 54 at or near the SIL objective. Either the convective cooling system or the thermal management system can be operated and controlled by the test controller or separately from the test controller. A different automated system can be used, or the components can be operated manually.

The test controller 84 can use general purpose or specific hardware and typically includes a display, a user interface and programming to control a variety of different tests. Alternatively, the tester 76 can control the tests and the test controller can be used only to observe and capture the results of the imaging by the CCD.

The enhanced thermal control described above greatly improves post silicon debugging at 32 nm process technologies and smaller. It is also useful for ultra mobile products with extended temperature product specifications.

Many modifications and variations are possible in light of the above teachings. Various equivalent combinations and substitutions may be made for various components and operations shown in the figures. The scope of the invention is not to be limited by this detailed description, but rather by the claims appended hereto.

The example lens tip, lens objective, pumps, fluids and pathways and the order of construction and operation described above are provided only as examples. The configurations shown may be varied from implementation to implementation depending upon numerous factors, such as price constraints, performance requirements, technological improvements, or other circumstances. The components shown may be exchanged for their logical or mechanical equivalents. Embodiments of the invention may be applied to a wide range of electronic testing systems and optical testing systems, the illustrated configurations are provided only as examples.

In the description above, numerous specific details are set forth. However, it is understood that embodiments of the invention may be practiced without these specific details. For example, well-known equivalent components may be substituted in place of those described herein. In addition, components may be removed or added to the illustrated circuit to improve results or add additional functions. In other instances, well-known circuits, structures and techniques have not been shown in detail to avoid obscuring the understanding of this description.

While the embodiments of the invention have been described in terms of examples, those skilled in the art may recognize that the invention is not limited to the embodiments described, but may be practiced with modification and alteration within the spirit and scope of the appended claims. The description is thus to be regarded as illustrative instead of limiting.

What is claimed is:

1. A solid immersion lens assembly comprising:
   a solid immersion lens objective;
   a solid immersion lens tip assembly optically coupled to the objective;
   a heat exchanger thermally coupled to the objective, wherein the heat exchanger is thermally coupled to the objective near the lens tip assembly; and
   a second heat exchanger thermally coupled to the objective farther from the tip assembly than the first heat exchanger to independently alternately heat or cool a portion of the objective different from that of the first heat exchanger.

2. The assembly of claim 1, wherein the second heat exchanger heats the objective when the lens tip assembly is cool and cools the objective when the lens tip assembly is hot.

3. The assembly of claim 1, further comprising a thermal sensor, thermally coupled to the objective and wherein the heat exchanger is controlled based at least in part on the temperature measured by the thermal sensor.

4. The assembly of claim 1, wherein the objective has an exterior surface and the second heat exchanger is thermally coupled to the exterior surface.

5. The assembly of claim 1, wherein the first and second heat exchangers comprise channels for a fluid to exchange heat between the fluid and the objective.

6. The assembly of claim 1, wherein the first heat exchanger comprises a plurality of fluid channels around an outside surface of the objectiive proximate the lens tip assembly.

7. The assembly of claim 1, further comprising a dry purge system coupled between the lens tip assembly and the objective to remove moisture between the lens tip assembly and the objective.

8. The assembly of claim 7, wherein the dry purge system conveys at least one of compressed dry air, nitrogen, and a moisture free, inert fluid.

9. A solid immersion lens assembly comprising:
a solid immersion lens objective;
a solid immersion lens tip assembly optically coupled to the objective;
a heat exchanger thermally coupled to the objective; and
a dry purge system coupled between the lens tip assembly and the objective to remove moisture between the lens tip assembly and the objective.

10. The assembly of claim 9, wherein the dry purge system conveys compressed dry air.

11. The assembly of claim 9, further comprising a gap between the lens tip assembly and the objective and passageways between the gap and a pump and wherein the dry purge system pumps a purge gas from the pump through the passageways to the gap.

12. The assembly of claim 9, wherein the dry purge system conveys at least one of compressed dry air, nitrogen, and a moisture free, inert fluid.

13. The assembly of claim 9, wherein the objective has an exterior surface and the heat exchanger is thermally coupled to the exterior surface.

14. The assembly of claim 9, wherein the heat exchanger comprises channels for a fluid to exchange heat between the fluid and the objective.

15. The assembly of claim 9, wherein the heat exchanger comprises a plurality of fluid channels around an outside surface of the objectiive proximate the lens tip assembly.

16. The assembly of claim 9, further comprising a thermal sensor, thermally coupled to the objective and wherein the heat exchanger is controlled based at least in part on the temperature measured by the thermal sensor.

17. The assembly of claim 9, wherein the heat exchanger is to alternately heat or cool the objective.

* * * * *